US009573151B1

(12) United States Patent
Miller et al.

(10) Patent No.: US 9,573,151 B1
(45) Date of Patent: Feb. 21, 2017

(54) LIQUID DISPENSER WITH REPLACEMENT INSERT

(71) Applicant: SONOCO DEVELOPMENT, INC, Hartsville, SC (US)

(72) Inventors: Paul Edward Miller, Cheraw, SC (US); Rachel Caroline Randall, Hartsville, SC (US); Jamie Lynn Ackerman, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 33 days.

(21) Appl. No.: 14/838,589

(22) Filed: Aug. 28, 2015

(51) Int. Cl.
*B65D 88/54* (2006.01)
*G01F 11/00* (2006.01)
*B05B 11/00* (2006.01)

(52) U.S. Cl.
CPC ........ *B05B 11/3047* (2013.01); *B05B 11/0054* (2013.01); *B05B 11/3001* (2013.01)

(58) Field of Classification Search
CPC ............. B05B 11/3047; B05B 11/0054; B05B 11/3001; B05B 11/0037; A47K 5/12; B65D 2583/005; B65D 77/065; B67D 7/84; A47G 23/0258
USPC ............. 222/325, 105, 106, 173, 183, 386.5
See application file for complete search history.

(56) References Cited

U.S. PATENT DOCUMENTS 1,229,556 A 6/1917 Watrous
4,280,638 A * 7/1981 Keihm .................... A47K 5/12 222/180
5,263,611 A 11/1993 Trippen
5,373,970 A * 12/1994 Ophardt ............... A47K 5/1207 222/181.2
5,474,212 A * 12/1995 Ichikawa ............ B05B 11/0043 222/105
6,832,702 B2 * 12/2004 Garcia ................ B05B 11/0037 222/183
6,832,916 B2 12/2004 Collopy
6,983,864 B1 * 1/2006 Cagle .................. B05B 11/0005 222/131
7,690,532 B2 4/2010 Walther et al.
7,913,877 B2 3/2011 Neuhalfen
8,336,740 B1 12/2012 Daansen
2005/0098580 A1 5/2005 Ciavarella
2009/0014470 A1 * 1/2009 Lin ..................... B05B 11/0043 222/95
2009/0026225 A1 * 1/2009 Lickstein ............. A47K 5/1202 222/325
2010/0163580 A1 * 7/2010 Ophardt ................ G01F 11/025 222/181.3
2011/0220652 A1 * 9/2011 Corbett .................. B65D 77/06 220/495.03
2011/0220682 A1 * 9/2011 Lim .................... B05B 11/0054 222/183
2013/0206791 A1 * 8/2013 O'Brien ................... B67D 7/84 222/105
2014/0151396 A1 6/2014 Stehli, Jr. et al.
2014/0166699 A1 6/2014 Stehli, Jr. et al.
(Continued)

*Primary Examiner* — Patrick M Buechner
*Assistant Examiner* — Benjamin R Shaw
(74) *Attorney, Agent, or Firm* — Miller, Matthias & Hull LLP

(57) ABSTRACT

A liquid dispenser having a replaceable liquid reservoir is provided. The dispenser may comprise a reusable body or shell, a reusable pump mechanism and a replaceable insert. The insert includes a liquid reservoir and an integral fitment.

2 Claims, 4 Drawing Sheets

(56) References Cited

U.S. PATENT DOCUMENTS

| | | | | |
|---|---|---|---|---|
| 2014/0252032 A1* | 9/2014 | Corbett | B65D 25/18 | 222/105 |
| 2015/0014354 A1* | 1/2015 | Kellenberger | B65D 81/3876 | 222/83 |
| 2016/0090220 A1* | 3/2016 | James | B65D 75/008 | 222/173 |

* cited by examiner

LIQUID DISPENSER WITH REPLACEMENT INSERT

BACKGROUND OF THE INVENTION

Field of the Invention

This disclosure relates to dispenser for liquids and other flowable substances. More particularly, this disclosure relates to a dispenser having a reusable outer shell and pump and a replaceable or refillable liquid reservoir.

Description of the Related Art

Traditional dispensers for liquid personal care products are typically one-time use, disposable dispensers. Once the contents are used the dispensers is discarded. Another disadvantage of disposable dispensers, especially in the personal care field, is that it can be difficult to obtain complete product evacuation from the dispenser.

Refillable-type dispensers, such as those used to pump hand soap, generally are refilled from a larger container to fill the smaller refillable dispenser. Although refilling is more economical for consumers, it can be messy and difficult.

The present disclosure is designed to solve the problems described above.

BRIEF SUMMARY OF THE INVENTION

The present disclosure relates to a liquid dispenser having a replaceable liquid reservoir. The dispenser may comprise a reusable body or shell, a reusable pump mechanism and a replaceable insert including the liquid reservoir and an integral fitment.

The reusable shell may comprise a bottom defining an opening for receiving a disposable insert, a sidewall extending upwardly from the bottom and a top wall terminating in a neck. The shell defines an interior space, and the neck defines an opening that may have a non-cylindrical inner bore.

The reusable pump may comprise a pump head defining a dispensing opening and mounted to a spring loaded plunger. The plunger is configured to move in reciprocating fashion within an outer tube. The outer tube is connected in stationary relationship to an intake tube. A threaded cap is affixed to the outer tube and has internals threads for threadably mounting the pump to a disposable insert. The intake tube extends into the interior space of the shell and terminate in an intake opening.

The disposable insert may comprise a product reservoir for holding liquid product. The reservoir defines a top opening for receiving a rigid fitment. The fitment comprises a substantially cylindrical, threaded portion having external threads for mating with the pump cap.

The fitment preferably includes an anti-rotation member affixed to a lower end of the threaded portion. The anti-rotation member nests within the neck of the shell and has an outer surface having a non-circular cross sectional shape that matches the non-circular cross-sectional inner bore of the neck.

DETAILED DESCRIPTION OF THE INVENTION

Figure 1:
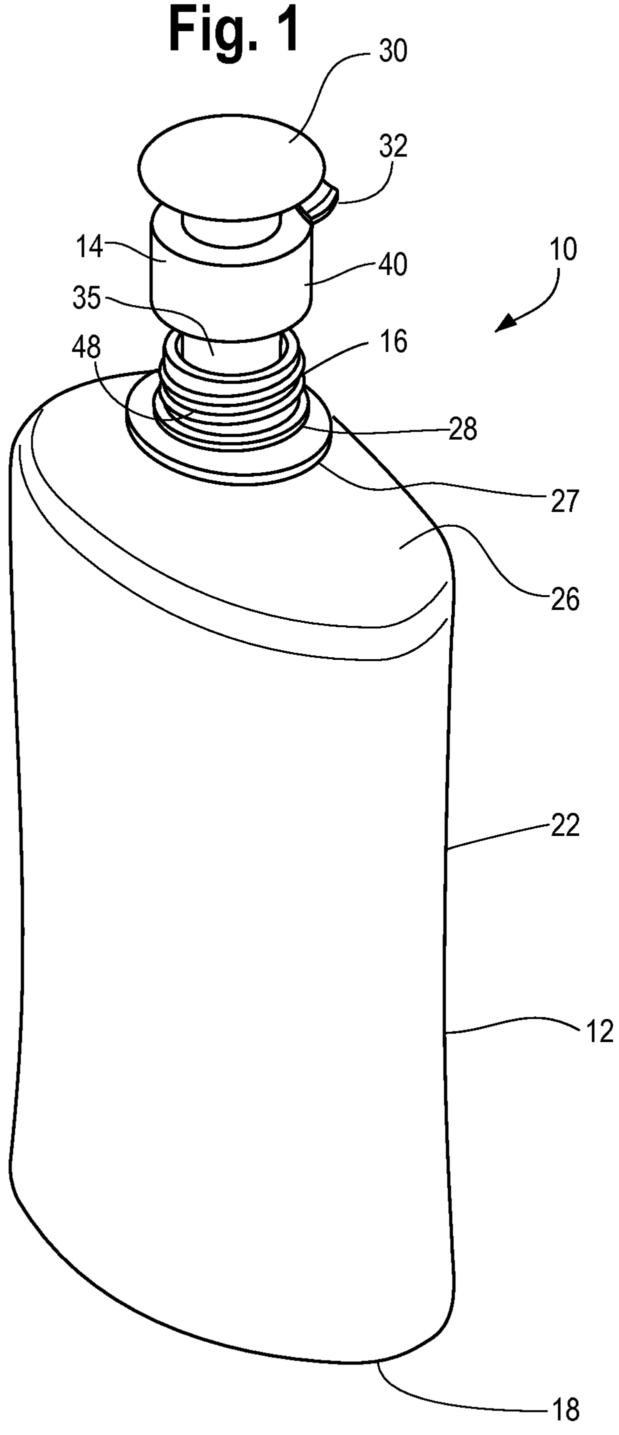
FIG. 1 is a top perspective view of a dispenser according to the disclosure.

While the invention described herein may be embodied in many forms, there is shown in the drawings and will herein be described in detail one or more embodiments with the understanding that this disclosure is to be considered an exemplification of the principles of the invention and is not intended to limit the disclosure to the illustrated embodiments.

Figure 2:
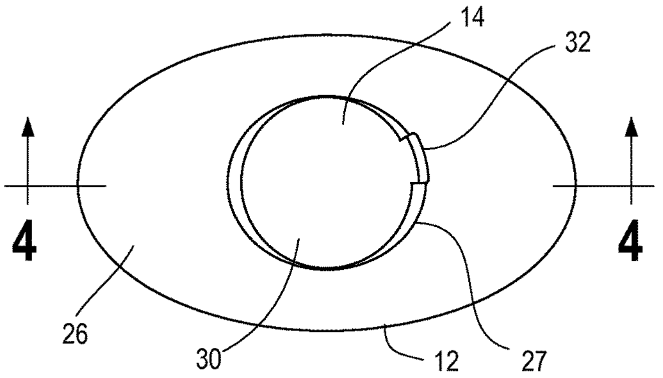
FIG. 2 is a top plan view of the dispenser of FIG. 1.
Figure 3:
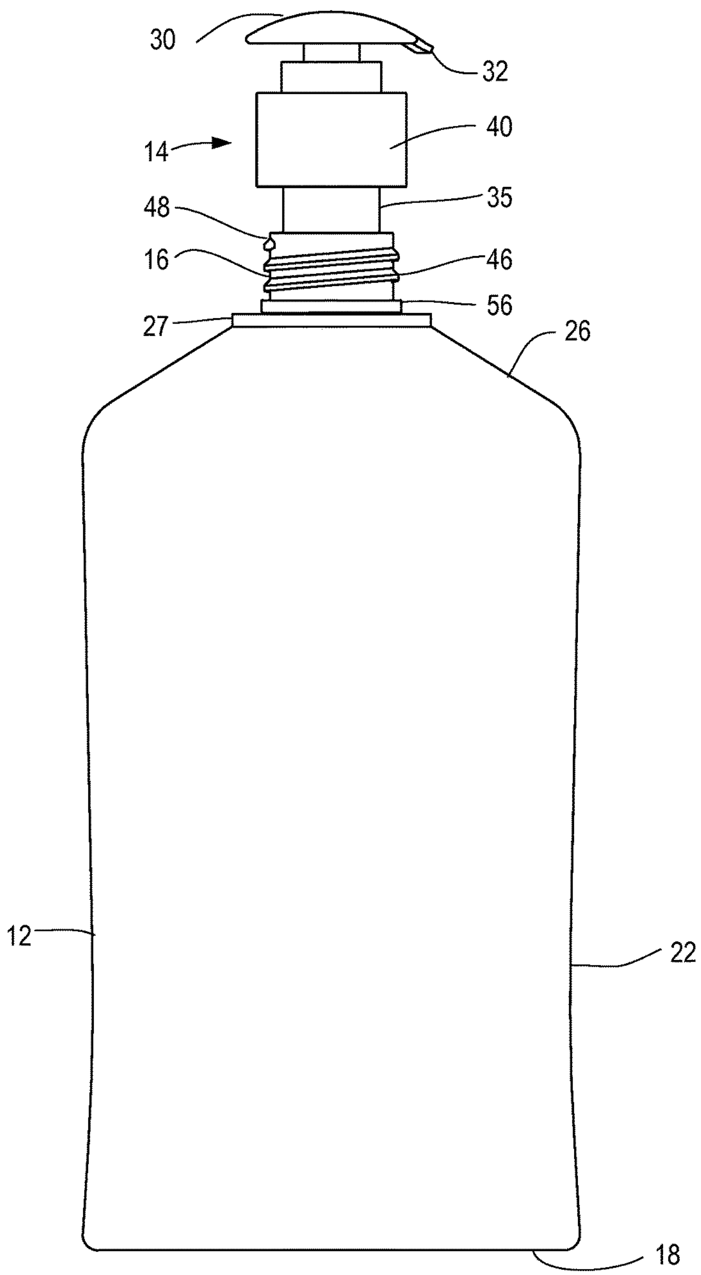
FIG. 3 is a side view of the dispenser of FIG. 1.

Turning to the drawings, there is shown in the figures one embodiment of a refillable dispenser 10 according to the disclosure. FIG. 1 is a perspective view of the dispenser 10, FIG. 2 is a top view of the dispenser 10, and FIG. 3 is a side view of the dispenser 10.

The dispenser 10 comprises a reusable shell 12, a reusable pump 14 and a disposable or refillable insert 16. As explained in more detail below, the insert 16 comprises a product reservoir 44 and a fitment 46 extending from the top of the product reservoir 44. The insert 16 fits inside the shell 10 with the fitment 46 extending through a top opening 28 in the shell 12, and may be affixed to the pump 14 by a threaded connection with the pump cap 40. In the figures the pump cap 40 is raised, that is, not connected to the fitment 46, in order to better show the insert 16 and, in particular, the fitment 46 which forms part of the insert 16.

The reusable shell 12 preferably is a rigid structure and may be injection molded from any suitable material, such as polypropylene. The shell 12 functions as the permanent exterior structure. The shell 12 may comprise a base or bottom 18 defining an opening 20 for receiving the insert 16, a substantially cylindrical sidewall 22 extending upwardly from the bottom 18 and defining an interior space 24, and a top wall 26 that terminates in a neck 27 that defines a top opening 28. The top wall 26 may be shaped like a truncated cone as shown in the figures or may be any suitably aesthetically pleasing shape. The neck 27 may define an inner bore that preferably is non-cylindrical to prevent the insert 16 from rotating as explained below.

Figure 4:
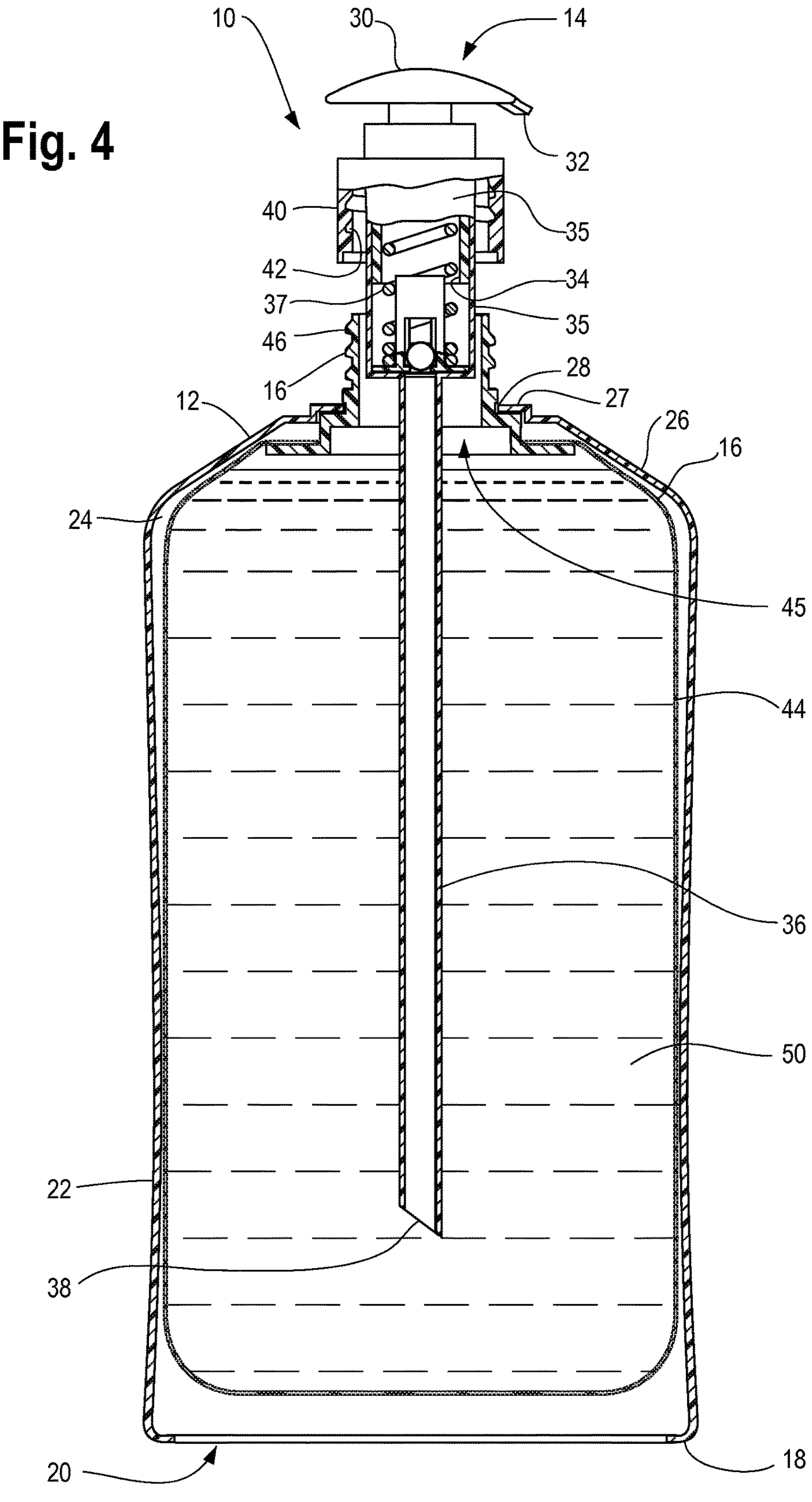
FIG. 4 is a cross-sectional view of the dispenser of FIG. 2 taken along line 4-4.

FIG. 4 is a side cutaway view of the dispenser 10. The pump 14 may be reused with the shell 12 and may be of conventional design. For example and without limitation, the pump 14 may comprise a pump head 30, a spring loaded plunger 34, an outer tube 35, an intake tube 36 and a threaded cap 40. The pump head 30 may define a dispensing opening 32 and is mounted on the spring loaded plunger 34. The plunger 34 moves in reciprocating fashion within the outer tube 35 between an up position and a down position and is biased in the up position by a spring 37. The outer tube 35 is connected in stationary relationship to the intake tube 36. In the assembled dispenser 10, the intake tube 36 extends into the interior space 24 of the shell 12 and terminates in an intake opening 38. The cap 40 may be affixed to the outer tube 35 and may have internals threads 42 for threadably mounting the pump 14 to the insert 16 as explained below.

The disposable insert 16 may comprise a product reservoir 44 for holding liquid product 50 and a fitment 46. The product reservoir 44 may be either a thin blown molded component or a bag-like pouch made of flexible material and has a top opening 45 for receiving the fitment 46. The thin material for the product reservoir 44 allows for improved product evacuation. The fitment 46 may be permanently affixed to the product reservoir 44 and may comprise a substantially cylindrical, threaded portion 48 having external threads 52 for threadably mating with the pump cap 40.

Figure 5:
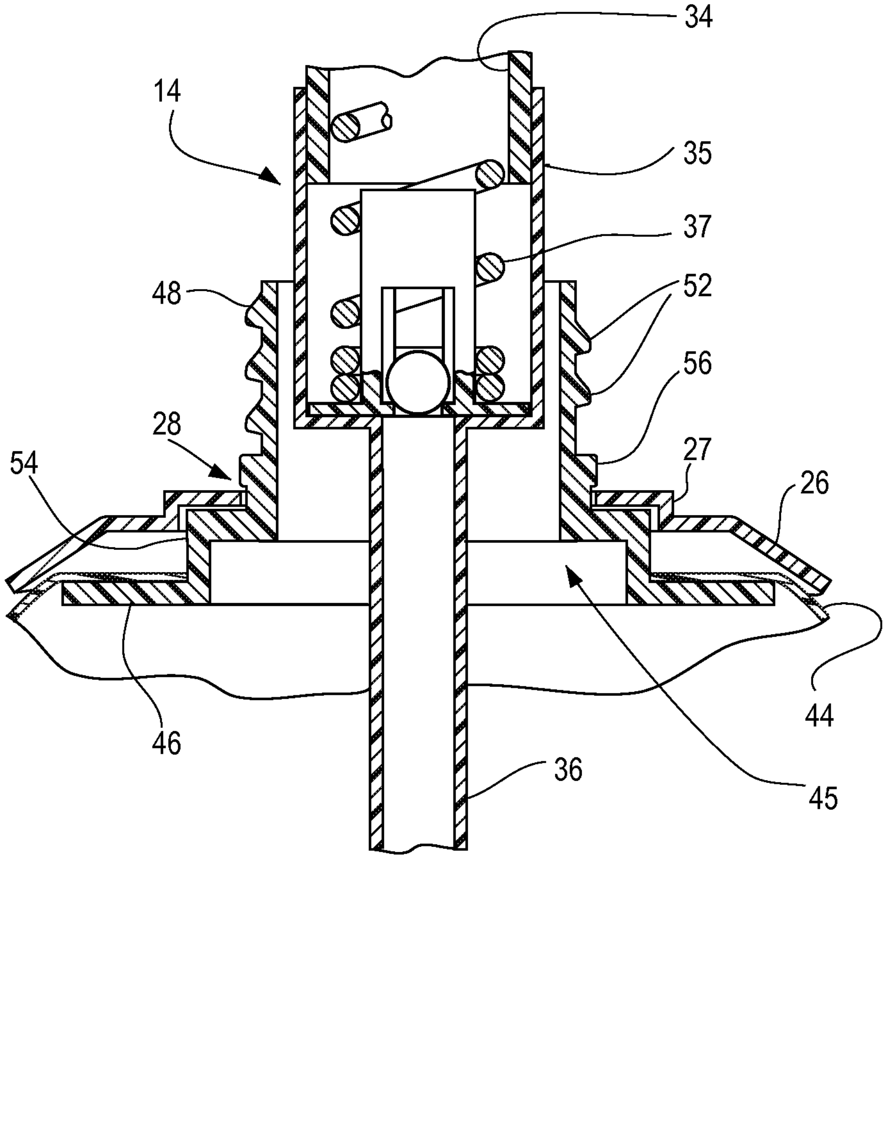
FIG. 5 is a partial side cutaway view of the dispenser of FIG. 1.

FIG. 5 is a partial side cutaway view of the dispenser 10. The fitment 46 may include an anti-rotation member 54 affixed to the lower end of the threaded portion 48. The anti-rotation member 54 nests within the shell neck 27 and preferably has an outer surface having a non-circular cross sectional shape that matches the non-circular cross-sectional shape of the inside of the shell neck 27 to prevent the fitment 46 from rotating with respect to the shell 12.

The fitment 46 may include a snap ring 56 that forms a snap fit with the shell neck 27 when the fitment 14 is inserted upwardly into the shell 12 and through the shell neck 27 to provide a secure connection between the shell 12, the pump 14 and the insert 16.

Refilling the Dispenser

To refill the dispenser 10, the consumer first removes the old insert 16. This may be done by unscrewing the pump cap 40 from the fitment 46, then pulling the insert 16, including the fitment 46 and the now empty product reservoir 44, through the opening in the bottom 18 of the shell 12. A new insert 16 can then be inserted through the opening in the bottom 18 of the shell 12 until the fitment 46 extends through the top opening 28 in the shell 12. The pump cap 40 can then be screwed onto the new fitment 46.

During both removal of the old insert 16 and installation of the new insert 16 the fitment 46 is prevented from rotating by the anti-rotation member 54. More specifically, the fitment 46 is prevented from rotating by the cooperation of the non-cylindrical anti-rotation member 54 and the non-cylindrical shell neck 27.

INDUSTRIAL APPLICABILITY

The refillable dispenser 10 may find applicability in, among other markets, the personal care and household product markets and the restaurant market. The dispenser 10 may be used to dispense such products as light duty liquids, beauty products, laundry products, lawn and garden care products, and bulk food service products.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A dispensing container comprising:

a reusable shell comprising a bottom defining an opening for receiving a disposable insert, a sidewall extending upwardly from the bottom and a top wall terminating in a neck, the shell defining an interior space, the neck defining an opening and having a non-cylindrical inner bore; a reusable pump comprising a pump head defining a dispensing opening and mounted to a spring loaded plunger, the plunger configured to move in reciprocating fashion within an outer tube, the outer tube connected in stationary relationship to an intake tube, and a threaded cap affixed to the outer tube and having internals threads for threadably mounting the pump to a disposable insert, the intake tube extending into the interior space of the shell and terminating in an intake opening; and a disposable insert comprising a product reservoir for holding liquid product and having a top opening for receiving a fitment, the fitment comprising a substantially cylindrical, threaded portion having external threads for mating with the pump cap.

2. The container of claim 1 wherein:

the fitment includes an anti-rotation member affixed to a lower end of the threaded portion, wherein the anti-rotation member nests within the neck and has an outer surface having a non-circular cross sectional shape that matches the non-circular cross-sectional inner bore of the neck.

* * * * *